United States Patent
Masaki et al.

(10) Patent No.: US 11,882,365 B2
(45) Date of Patent: Jan. 23, 2024

(54) CONTINUUM ROBOT APPARATUS, METHOD, AND MEDIUM

(71) Applicants: Canon U.S.A., Inc., Melville, NY (US); The Brigham and Women's Hospital Inc., Boston, MA (US)

(72) Inventors: Fumitaro Masaki, Cambridge, MA (US); Franklin King, Allston, MA (US); Takahisa Kato, Brookline, MA (US); Brian Ninni, Woburn, MA (US); HuaLei Shelley Zhang, Brookline, MA (US); Nobuhiko Hata, Newton, MA (US)

(73) Assignees: Canon U.S.A., Inc., Melville, NY (US); The Brigham and Women's Hospital, Inc., Boston, MA (US)

( * ) Notice: Subject to any disclaimer, the term of this patent is extended or adjusted under 35 U.S.C. 154(b) by 0 days.

(21) Appl. No.: 17/673,606

(22) Filed: Feb. 16, 2022

(65) Prior Publication Data
US 2022/0264020 A1    Aug. 18, 2022

Related U.S. Application Data

(60) Provisional application No. 63/150,859, filed on Feb. 18, 2021.

(51) Int. Cl.
*H04N 5/232*      (2006.01)
*H04N 23/695*      (2023.01)

(52) U.S. Cl.
CPC ................ *H04N 23/695* (2023.01)

(58) Field of Classification Search
CPC ........... H04N 5/23299; H04N 5/23296; G01S 3/7864; G08B 13/19608; G03B 5/00; G02B 15/14
(Continued)

(56) References Cited

U.S. PATENT DOCUMENTS

| 7,520,854 B2 * | 4/2009 | Sato .................... A61B 1/00042 600/152 |
| 9,763,741 B2 * | 9/2017 | Alvarez ................ A61B 1/018 |

(Continued)

FOREIGN PATENT DOCUMENTS

| WO | 2018/191658 A1 | 10/2018 |
| WO | 2020/123671 A1 | 6/2020 |

OTHER PUBLICATIONS

International Search Report for International Application No. PCT/US2022/016660 dated Jun. 7, 2022, PCT International Searching Authority, Korean Intellectual Property Office, Seo-Gu, Daejeon (3 pages).

(Continued)

*Primary Examiner* — Pritham D Prabhakher
(74) *Attorney, Agent, or Firm* — Canon U.S.A., Inc. IP Division

(57) ABSTRACT

An apparatus for correction of a direction to which a tool channel or a camera moves or is bent in a case where a displayed image is rotated. The apparatus includes at least one memory and at least one processor that executes instructions stored in the memory to receive a directional command of a capturing direction of a camera, move the capturing direction of the camera according to the received directional command, detect a rotation amount of a captured image displayed on a monitor, wherein the captured image is captured by the camera, and correct, based on the detected rotation amount, directional information corresponding to a particular directional command or directional coordinate for moving the camera, wherein the directional information is used for moving the capturing direction of the camera.

22 Claims, 22 Drawing Sheets

(58) Field of Classification Search
USPC .................................................. 348/207.11
See application file for complete search history.

(56) References Cited

U.S. PATENT DOCUMENTS

| | | | |
|---|---|---|---|
| 9,918,681 B2* | 3/2018 | Wallace | A61B 8/4218 |
| 10,572,143 B2* | 2/2020 | Irie | G03B 17/18 |
| 10,603,124 B2 | 3/2020 | Camarillo et al. | |
| 10,653,866 B2 | 5/2020 | Duindam et al. | |
| 10,743,750 B2* | 8/2020 | Hunter | A61B 1/0016 |
| 10,835,153 B2* | 11/2020 | Rafii-Tari | A61B 34/20 |
| 10,849,699 B2 | 12/2020 | Kose et al. | |
| 10,893,794 B2 | 1/2021 | Belson | |
| 11,070,745 B2* | 7/2021 | Hale | A61B 90/361 |
| 11,364,629 B2* | 6/2022 | Sefati | B25J 19/025 |
| 2006/0015012 A1 | 1/2006 | Sato | |
| 2013/0072787 A1* | 3/2013 | Wallace | A61B 90/50 |
| | | | 600/424 |
| 2015/0018622 A1* | 1/2015 | Tesar | A61B 90/20 |
| | | | 600/202 |
| 2015/0119637 A1 | 4/2015 | Alvarez et al. | |
| 2017/0049298 A1* | 2/2017 | Hunter | A61B 5/067 |
| 2017/0150031 A1* | 5/2017 | Oshima | G03B 17/561 |
| 2018/0234635 A1* | 8/2018 | Hayashi | H04N 23/695 |
| 2018/0247419 A1* | 8/2018 | Lee | H04N 23/631 |
| 2018/0284966 A1* | 10/2018 | Irie | H04N 23/662 |
| 2018/0292199 A1 | 10/2018 | Tojo et al. | |
| 2019/0015978 A1* | 1/2019 | Takagi | B25J 9/065 |
| 2019/0247131 A1 | 8/2019 | Hoffman et al. | |
| 2020/0338723 A1* | 10/2020 | Sefati | A61B 34/20 |
| 2021/0038178 A1* | 2/2021 | Mata | A61B 17/1703 |
| 2021/0127074 A1* | 4/2021 | Hale | A61B 1/00009 |
| 2021/0267695 A1* | 9/2021 | Hazelton | A61B 17/00234 |
| 2022/0174220 A1* | 6/2022 | Flessas | H04N 23/695 |

OTHER PUBLICATIONS

Written Opinion for International Application No. PCT/US2022/016660 dated Jun. 7, 2022, PCT International Searching Authority, Korean Intellectual Property Office, Seo-Gu, Daejeon (4 pages).

* cited by examiner

CONTINUUM ROBOT APPARATUS, METHOD, AND MEDIUM

CROSS REFERENCE TO RELATED APPLICATIONS

The present application claims the benefit of priority from U.S. Provisional Application No. 63/150,859 filed Feb. 18, 2021, which is hereby incorporated by reference herein in its entirety.

BACKGROUND

Field of the Disclosure

The present disclosure generally relates to imaging and, more particularly, to a continuum robot apparatus, method and storage medium to implement automatic correction of a direction to which a tool channel or a camera moves or is bent in a case where a displayed image is rotated.

Description of the Related Art

Endoscopy, bronchoscopy, and other medical procedures facilitate the ability to look inside a body. During such a procedure, a flexible medical tool can be inserted into a patient's body and an instrument can be passed through the tool to examine or treat an area inside the body. A bronchoscope is an endoscopic instrument to view inside the airways of a patient. Catheters and other medical tools can be inserted through a tool channel in the bronchoscope to provide a pathway to a target area in the patient for diagnosis, treatment, or the like.

An imaging device such as a camera can be placed in the bronchoscope to capture images inside the patient, and a display or monitor can be used to view the captured images. Calibration can take place between movement of the camera and movement of a captured image on the display. If the captured image is rotated on a display coordinate after the calibration is performed, a relationship between positions of a displayed image and positions of the monitor is changed. On the other hand, the tool channel or the camera can move or be bent in the same way regardless of the rotation of the displayed image when a particular command is received to move or change position, for example, a command to let the tool channel or the camera or a capturing direction of the camera move or change position. This causes a change of a relationship between the positions of the monitor and a direction to which the tool channel or the camera moves on the monitor according to a particular command, for example, tilting a joystick to up, down, right or left. For example, when the calibration is performed, by tilting the joystick upward, the tool channel or the camera can bend to a direction corresponding to a top of the monitor. However, after the captured image on the display is rotated, by tilting the joystick upward, the tool channel or the camera may not be not be bent to the direction corresponding to the top of the monitor but may be bent to a direction diagonally upward of the monitor. This complicates user interaction between the camera and the monitor.

It would be beneficial to overcome these concerns and implement automatic correction of a direction to which a tool channel or a camera moves or is bent in a case where a displayed image is rotated.

SUMMARY

According to an aspect of the present disclosure, an apparatus for correction of a direction to which a tool channel or a camera moves or is bent in a case where a displayed image is rotated. The apparatus includes at least one memory and at least one processor that executes instructions stored in the memory to receive a directional command of a capturing direction of a camera, move the capturing direction of the camera according to the received directional command, detect a rotation amount of a captured image displayed on a monitor, wherein the captured image is captured by the camera, and correct, based on the detected rotation amount, directional information corresponding to a particular directional command or directional coordinate for moving the camera, wherein the directional information is used for moving the capturing direction of the camera.

Further features of the present disclosure will become apparent from the following description of exemplary embodiments with reference to the attached drawings.

BRIEF DESCRIPTION OF THE DRAWINGS

FIGS. 1(a) to 1(h), illustrates rotation of a displayed camera image without an automatic correction of a bending direction of the tool channel or the camera according to an exemplary embodiment.

FIGS. 2(a) to 2(h), illustrates rotation of a displayed camera image with an automatic correction of a bending direction of the tool channel or the camera according to an exemplary embodiment.

FIGS. 3(a) to 3(h), illustrates rotation of a displayed camera image with an alternative way of automatic correction of a bending direction of the tool channel or the camera according to an exemplary embodiment.

DESCRIPTION OF THE EMBODIMENTS

Figure 1:
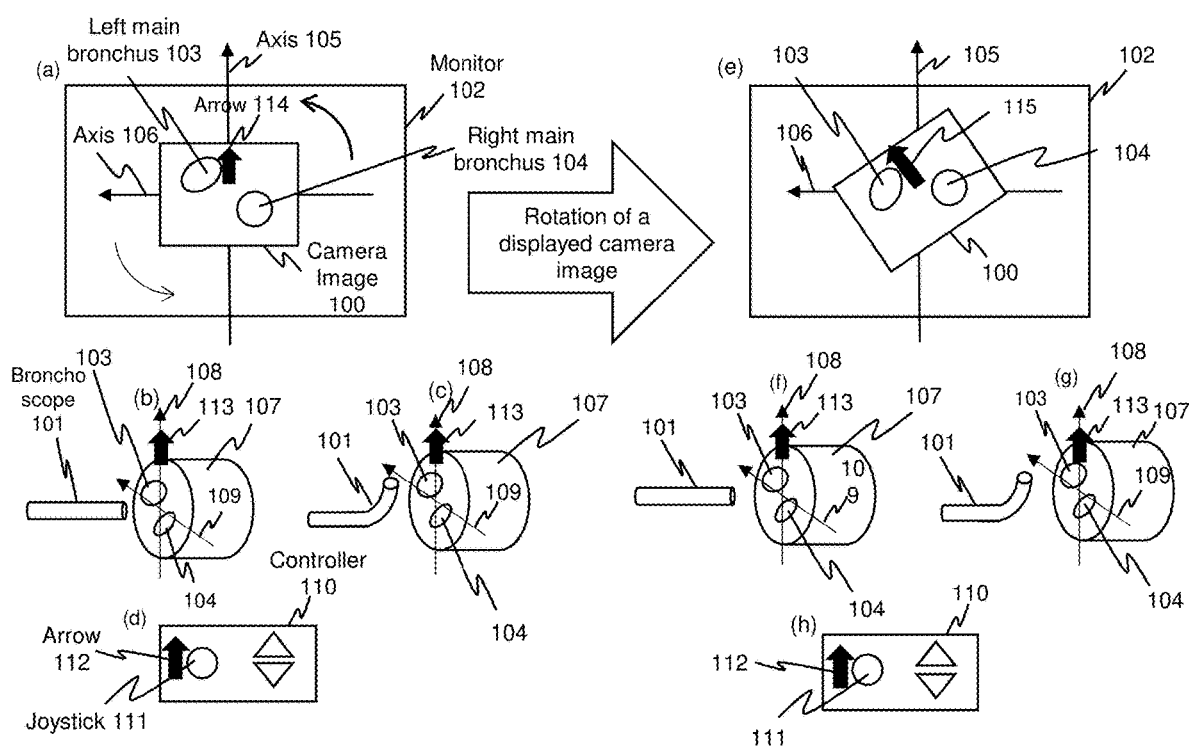
FIG. 1, which includes

Various exemplary embodiments, features, and aspects of the disclosure will be described with reference to the drawings.

In the following embodiments, continuum robot configurations are described that may functionally interact with a flexible endoscope. The continuum robot configurations that are described may have different characteristics, advantages, disadvantages, performance parameters, or the like. The present disclosure is not limited to any particular configuration.

According to some embodiments, a direction to which a tool channel or a camera moves or is bent is corrected automatically in a case where a displayed image is rotated. The continuum robot configuration described below enables to keep a correspondence between a direction on a monitor (top, bottom, right or left of the monitor) and a direction the tool channel or the camera moves on the monitor according to a particular directional command (up, down, turn right or turn left) even if the displayed image is rotated.

According to some embodiments, continuum robot apparatus configurations are described as robotic bronchoscope arrangements that may be equipped with a tool channel for an imaging device and medical tools, where the imaging device and the medical tools are exchanged by inserting and retracting them. The imaging device can be a camera or other imaging device, and the medical tool can be a biopsy tool or other medical device.

The robotic bronchoscope arrangements are used in association with one or more display devices and control devices.

The display device displays, on a monitor, an image captured by the camera and the display device has a display coordinate used for displaying the captured image. For example, top, bottom, right and left of the monitor is defined by axes of the displaying coordinate and a relative position of the captured image against the monitor is defined on the displaying coordinate.

In addition, the control device controls a moving direction of the tool channel or the camera. For example, the tool channel or the camera is bent according to a control by the control system. The control device has an operational controller (for example, a gamepad, a joystick, etc.) and a control coordinate. The control coordinate defines moving (or bending) direction of the tool channel or the camera. The control coordinate defines a direction to which the tool channel or the camera moves or is bent when a particular command is input by the operational controller. For example, if a user inputs an "up" command via the operational controller, then the tool channel or the camera moves toward a direction which is defined by the control coordinate as an upward direction.

Before a user operates the robotic bronchoscope, a calibration is performed. By the calibration, a direction to which the tool channel or the camera moves or is bent according to a particular command (up, down, turn right or turn left) is adjusted to match a direction (top, bottom, right or left) on a display (or on the display coordinate).

For example, the calibration is performed so that an upward of the displayed image on the display coordinate corresponds to an upward direction on the control coordinate (a direction to which the tool channel or the camera moves according to an "up" command).

By the calibration, when a user inputs an "up" command of the tool channel or the camera, the tool channel or the camera is bent to an upward direction on the control coordinate. The direction to which the tool channel or the camera is bent corresponds to an upward direction of the capture image displayed on the display.

In addition, a rotation function of a display of the captured image on the display coordination can be performed. For example, when the camera is deployed, the orientation of the camera view (top, bottom, right and left) should match with a conventional orientation of the bronchoscopic camera view physicians or other medical personnel typically see in their normal bronchoscope procedure: the right and left main bronchus should be displayed horizontally on a monitor. Then, if right and left main bronchus in a captured image are not displayed horizontally on the display, a user rotates the captured image on the display coordinate so that the right and left main bronchus are displayed horizontally on the monitor.

If the captured image is rotated on the display coordinate after a calibration is performed, a relationship between the top, bottom, right and left of the displayed image and top, bottom, right and left of the monitor is changed. On the other hand, the tool channel or the camera moves or is bent in the same way regardless of the rotation of the displayed image when a particular command is received (for example, a command to let the tool channel or the camera (or a capturing direction of the camera) move upward, downward, right or left).

This causes a change of a relationship between the top, bottom, right and left of the monitor and a direction to which the tool channel or the camera moves (up, down, right or left) on the monitor according to a particular command (for example, tilting a joystick to up, down, right or left). For example, when the calibration is performed, by tilting the joystick upward, the tool channel or the camera is bent to a direction corresponding to a direction top of the monitor. However, after the captured image on the display is rotated, by tilting the joystick upward, the tool channel or the camera may not be bent to the direction corresponding to the direction of the top of the monitor but may be bent to a direction to a diagonally upward of the monitor. This complicates user interaction.

When the camera is inserted into the continuum robot apparatus, an operator can map or calibrate the orientation of the camera view, the user interface device and the robot end-effector. However, this is not enough for bronchoscopists because (1) the right and left main bronchus is displayed in arbitrary direction in this case, and (2) bronchoscopists rely on how the bronchi look to navigate a bronchoscope and they typically confirm the location of the bronchoscope using how the right and left main bronchus look like.

According to some embodiments, a direction to which a tool channel or a camera moves or is bent is corrected automatically in a case where a displayed image is rotated. The continuum robot configurational embodiments described below enable to keep a correspondence between a direction on a monitor (top, bottom, right or left of the monitor), a direction the tool channel or the camera moves on the monitor according to a particular directional command (up, down, turn right or turn left), and a user interface device even if the displayed image is rotated.

Figure 2:
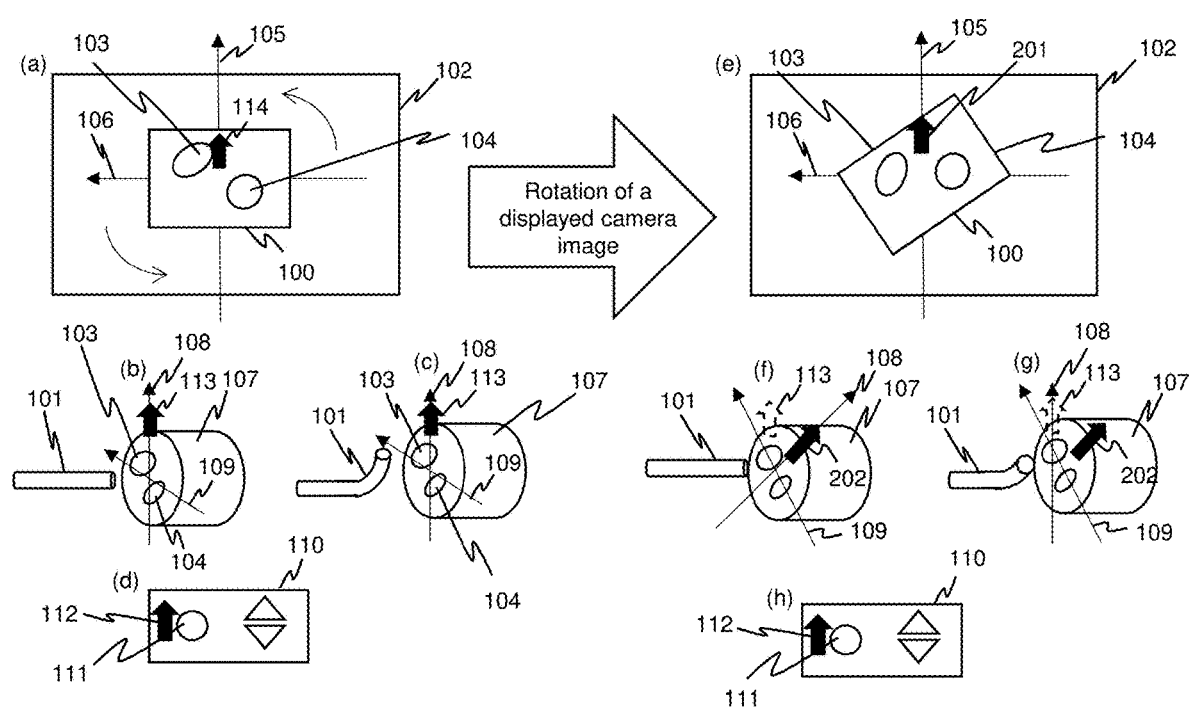
FIG. 2, which includes
Figure 3:
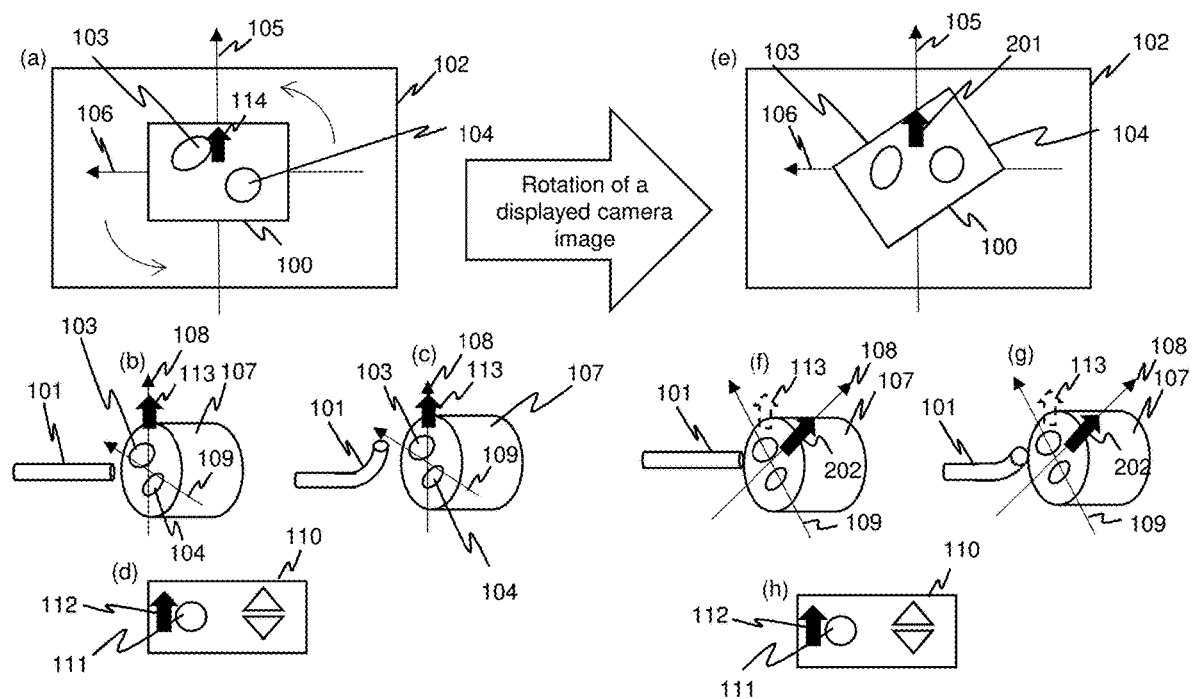
FIG. 3, which includes

An overview of exemplary embodiments is explained by using FIGS. 1, 2 and 3.

FIGS. 1(a) and 1(e) show a rotation of a displayed camera image 100 without an automatic correction of a bending direction of the tool channel or the camera. The camera image 100 is an image captured by a camera. For example, the camera may be an endoscope or a bronchoscope. The camera may be inserted into a human body (for example, into an airway or lung) by using a tool channel. The tool channel may be a catheter. In these embodiments, a combination of a camera and a catheter is called a bronchoscope 101.

FIG. 1(a) shows the camera image 100 before being rotated. The camera image 100 is displayed on a monitor 102. A left main bronchus 103 and a right main bronchus 104 are in the camera image 100. An axis 105 and axis 106 are coordinate axes of a display coordinate. The axis 105 defines top and bottom (a vertical direction) of the monitor 102. The axis 106 defines right and left (a horizontal direction) of the monitor 102.

FIG. 1(b) shows a bronchoscope 101 facing to the left main bronchus 103 and the right main bronchus 104 in an airway 107. An axis 108 and axis 109 are coordinate axes of a control coordinate (directional coordinate). An axis 108 defines an up direction and down direction (a vertical direction) of the control coordinate. An axis 109 defines a right direction and a left direction (a horizontal direction) of the control coordinate.

FIG. 1(c) shows a bronchoscope 101 being bent toward upward of the control coordinate.

FIG. 1(d) shows a gamepad (operational controller) 110. The gamepad no is used by a user to move the bronchoscope 101 in the airway 107. The gamepad no contains a joystick 111. A user can control a bending direction of the bronchoscope 101 by operating the joystick 111. For example, if a user moves it upward (a direction indicated by an arrow 112 in FIG. 1(d), the bronchoscope 101 is bent toward upward of the control coordinate (to the direction along with the axis 108) as shown by arrow 113 in FIG. 1(c). If the bronchoscope 101 is bent upward, a viewpoint on the camera image 100 moves toward top of the monitor (to the direction indicated by an arrow 114 (directional information)). That is, a tip of the bronchoscope 101 moves toward upward (along the axis 105) on the monitor.

In FIG. 1(a), the left main bronchus 103 and the right main bronchus 104 are not displayed horizontally on the monitor 102. Then a user may instruct a display device to rotate the camera image 100 so that the main bronchus 103 and the right main bronchus 104 are displayed horizontally on the monitor 102. Alternatively, the camera image 100 may be rotated automatically so that the main bronchus 103 and the right main bronchus 104 are displayed horizontally on the monitor 102 based on an image analysis of the camera image 100. The display device may detect right and left bronchus in the camera image 100 and rotate the camera image 100 automatically based on the detection so that a line connecting centers of the right and left bronchus becomes level.

FIG. 1(e) shows camera image 100 after being rotated counterclockwise on the monitor 102 so that the main bronchus 103 and the right main bronchus 104 are displayed horizontally on the monitor 102 (so that a line connecting centers of the right and left bronchus becomes level).

FIGS. 1(f) and 1(g) show bending motions of the bronchoscope 101 according to an "up" command input by the gamepad 110. In this example, the bronchoscope 101 is bent in the same way as explained above by using FIGS. 1(b), 1(c) and 1(d) regardless of the rotation of the camera image 100.

In FIG. 1(e), if the bronchoscope 101 is bent upward, a viewpoint on the camera image 100 moves toward diagonally upward the monitor (to the direction indicated by an arrow 115 (directional information)). In this case, as shown by FIG. 1(a) and FIG. 1(e), when the camera image 100 is rotated, the direction to which the bronchoscope 101 moves on the monitor 102 changes even if the same command (for example "up" command) is input by the gamepad 110. This may cause a user to be confused and may cause a misoperation of the bronchoscope 101.

FIGS. 2(a) and 2(e) show a rotation of a displayed camera image 100 with an automatic correction of a bending direction of the bronchoscope 101.

FIGS. 2(a), 2(b), 2(c), and 2(d) show the same as FIGS. 1(a), 1(b), 1(c), and 1(d), where FIG. 2(a) shows the camera image 100 before being rotated. The camera image 100 is displayed on the monitor 102. The left main bronchus 103 and the right main bronchus 104 are in the camera image 100. The axis 105 and axis 106 are coordinate axes of a display coordinate. The axis 105 defines top and bottom (a vertical direction) of the monitor 102. The axis 106 defines right and left (a horizontal direction) of the monitor 102.

FIG. 2(b) shows the bronchoscope 101 facing to the left main bronchus 103 and the right main bronchus 104 in an airway 107. The axis 108 and axis 109 are coordinate axes of a control coordinate (directional coordinate). The axis 108 defines an up direction and down direction (a vertical direction) of the control coordinate. The axis 109 defines a right direction and a left direction (a horizontal direction) of the control coordinate.

FIG. 2(c) shows the bronchoscope 101 being bent toward upward of the control coordinate.

FIG. 2(d) shows the gamepad (operational controller) 110. The gamepad no is used by a user to move the bronchoscope 101 in the airway 107. The gamepad no contains the joystick 111. A user can control a bending direction of the bronchoscope 101 by operating the joystick 111. For example, if a user moves upward (a direction indicated by an arrow 112 in FIG. 2(d)), the bronchoscope 101 is bent toward upward of the control coordinate (to the direction along with the axis 108) as shown by arrow 113 in FIG. 2(c). If the bronchoscope 101 is bent upward, a viewpoint on the camera image 100 moves toward top of the monitor (to the direction indicated by an arrow 114 (directional information)). That is, a tip of the bronchoscope 101 moves toward upward (along the axis 105) on the monitor.

In FIG. 2(a), the left main bronchus 103 and the right main bronchus 104 are not displayed horizontally on the monitor 102. Then a user may instruct a display device to rotate the camera image 100 so that the main bronchus 103 and the right main bronchus 104 are displayed horizontally on the monitor 102. Alternatively, the camera image 100 may be rotated automatically so that the main bronchus 103 and the right main bronchus 104 are displayed horizontally on the monitor 102 based on an image analysis of the camera image 100. The display device may detect right and left bronchus in the camera image 100 and rotate the camera image 100 automatically based on the detection so that a line connecting centers of the right and left bronchus becomes level.

FIG. 2(e) shows camera image 100 after being rotated counterclockwise on the monitor 102 so that the main bronchus 103 and the right main bronchus 104 are displayed horizontally on the monitor 102 (so that a line connecting centers of the right and left bronchus becomes level).

FIGS. 2(f) and 2(g) show bending motions of the bronchoscope 101 according to an "up" command input by the gamepad 110. In this example, the bronchoscope 101 is bent in the same way as explained above by using FIGS. 2(b), 2(c) and 2(d) regardless of the rotation of the camera image 100.

In FIG. 2(e), if the bronchoscope 1501 is bent upward, a viewpoint on the camera image 100 moves toward diagonally upward the monitor (to the direction indicated by an arrow 115 (directional information)). In this case, as shown by FIG. 2(a) and FIG. 2(e), when the camera image 100 is rotated, the direction to which the bronchoscope 101 moves on the monitor 102 changes even if the same command (for example "up" command) is input by the gamepad 110. This may cause a user to be confused and may cause a misoperation of the bronchoscope 101.

In the embodiment of FIG. 2, the direction to which the bronchoscope 101 is bent according to the same command (for example "up" command) changes in a case where the captured image 100 is rotated as shown FIGS. 2(b), 2(c), 2(f) and 2(g).

The arrow 113 in FIGS. 2(b) and 2(c) shows a direction to which the bronchoscope 101 is bent according to an "up" operation shown in FIG. 2(d).

The arrow 202 in FIGS. 2(f) and 2(g) shows a direction to which the bronchoscope 101 is bent according to an "up" operation shown in FIG. 2(d) after the camera image 100 displayed on the monitor 102 is rotated.

If the camera image 100 is rotated on the monitor 102, a direction to which the bronchoscope 101 is bent according to the up operation is automatically corrected from a first direction indicated by an arrow 113 to a second direction indicated by an arrow 202 in FIGS. 2(f) and 2(g).

If the bronchoscope 101 moves along the arrow 202, the viewpoint of the bronchoscope 101 moves on the monitor 102 towards top of the monitor 102 as indicated by an arrow 201 which indicates the same direction (directional information) as arrow 114 in FIG. 2(a). The direction to which the bronchoscope bends may be indicated by an indicator on the monitor 102. For example, the arrow 201 (an indicator) may be superimposed on the captured image 100 displayed on the monitor 102 in a case where the joystick 111 is tilted to a direction indicated by an arrow 112.

In this way, the viewpoint of the bronchoscope 101 moves in the same direction on the monitor 102 according to a particular command (for example, "up" command of the bronchoscope 101) even if the camera image 100 is rotated on the monitor 102. This may prevent a user from being confused and can prevent a misoperation of the bronchoscope 101.

FIGS. 3(a) to 3(h) show an alternative way of an automatic correction of a bending direction of the bronchoscope 101.

In the embodiment according to FIGS. 2(a) to 2(h), a moving direction on the control coordinate (directional coordinate) is corrected in a case where the camera image 100 is rotated.

On the other hand, in the embodiment according to FIGS. 3(a) to 3(h), a moving direction on the control coordinate is not corrected even if the camera image 100 is rotated. Instead, the axes of the control coordinate (directional coordinate) are rotated in a case where the camera image 100 is rotated.

In the embodiment according to FIGS. 3(a) to 3(h), the axis 108 and axis 109 of the control coordinate is rotated in accordance with the rotation of the camera image 100.

In this way, the viewpoint of the bronchoscope 101 moves in the same direction on the monitor 102 according to a particular command (for example, an "up" command of the bronchoscope 101) even if the camera image 100 is rotated on the monitor 102. This may prevent a user from being confused and can prevent a misoperation of the bronchoscope 101.

Figure 4:
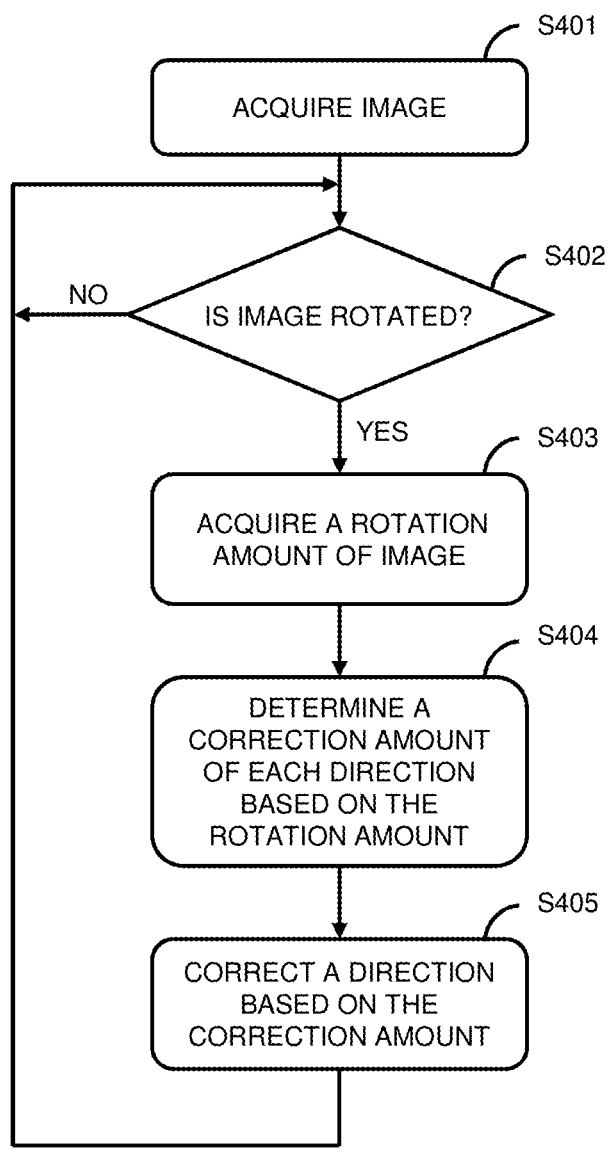
FIG. 4 illustrates a flowchart for the automatic correction of the bending direction of a bronchoscope according to an exemplary embodiment.

Procedures for the automatic correction of the bending direction of the bronchoscope 101 is explained by using a first embodiment FIG. 4. The steps of the first embodiment shown in FIG. 4 may be performed by at least one processor of a controller, a central processing unit (CPU), for example. The CPU in the controller may execute a program stored in at least one memory of the controller and perform the processes shown by FIG. 4.

In step S401, a camera acquires an image. In step S402, the processor determines whether the camera image 100 displayed on the monitor 102 is rotated. The processor may determine that the camera image 100 is rotated in a case where rotation command of the camera image 100 is received. If the camera image 100 is not rotated, the processor repeats step S402. If it is determined that the camera image 100 is rotated, then the processor proceeds to step S403 and acquires a rotation amount of the camera image 100. For example, the rotation amount may be measured by an angle the camera image 100 is rotated on the monitor 102.

In a case where the rotation amount is acquired, in step S403, the processor determines in step S404, based on the acquired rotation amount, a correction amount of each direction corresponding to respective moving commands (for example turn up, turn down, turn right or turn left command of the tip of the bronchoscope 101) as shown by FIGS. 2(f) and 2(g).

Alternatively, in step S404, the processor determines, based on the acquired rotation amount, a correction amount of inclinations of the axis 108 and the axis 109 as shown by FIGS. 3(f) and 3(g).

In step S405, the processor corrects, based on the result of the determination in step S404, each direction corresponding to respective moving commands or the inclinations of the axis 108 and the axis 109.

After the correction is performed, the process returns to step S402.

Continuum robot processing according to some embodiments implements functioning through use of one or more processes, techniques, algorithms, or the like, that can automatically register a virtual device model to image space. The continuum robot configuration system can provide a plurality of modes. The plurality of modes can include, for example, an automatic registration mode (a first mode), a manual registration mode (a second mode), or the like. If the automatic registration mode is selected by the user, the automatic correction as shown in FIGS. 2(g), 3(g), and step S405 of FIG. 4 is performed in a case where the captured image is rotated. On the other hand, if the manual registration mode is selected by the user, the automatic correction is not performed even if the captured image is rotated.

Figure 5:
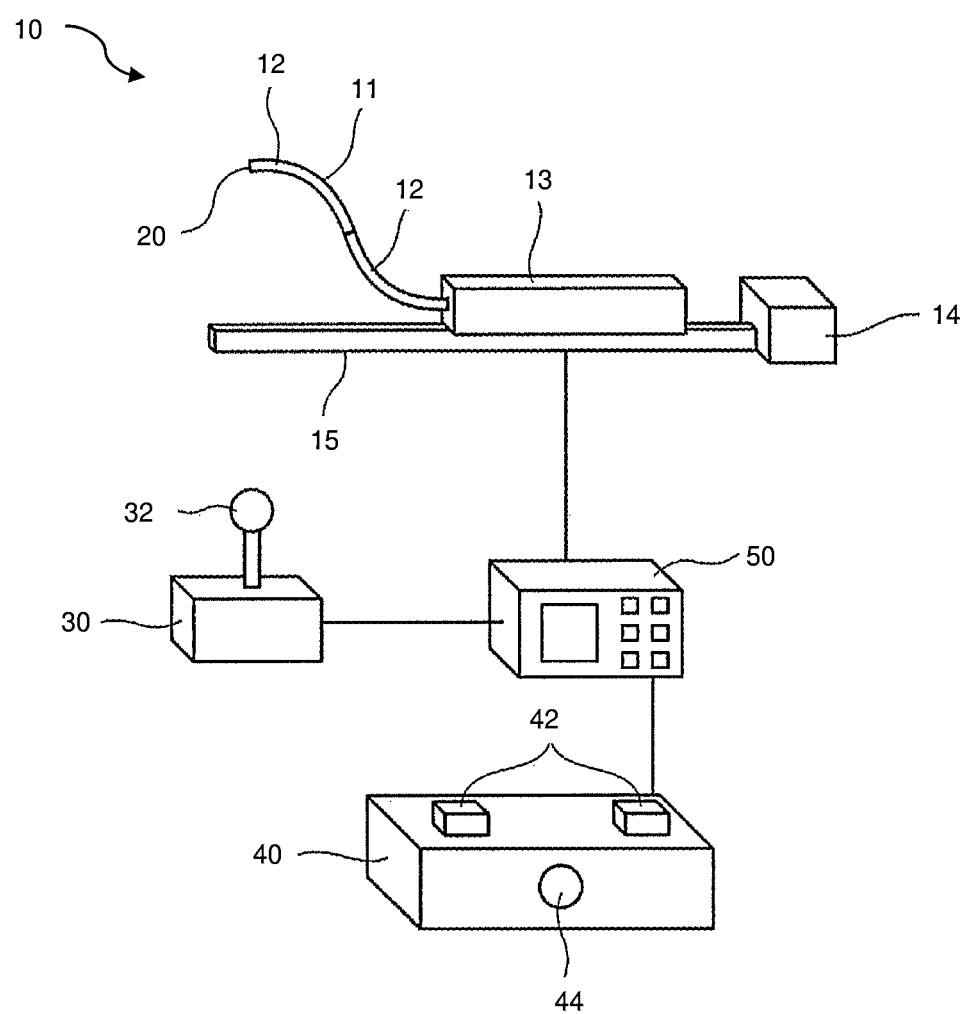
FIG. 5 illustrates a diagram of a continuum robot apparatus according to an exemplary embodiment.
Figure 6:
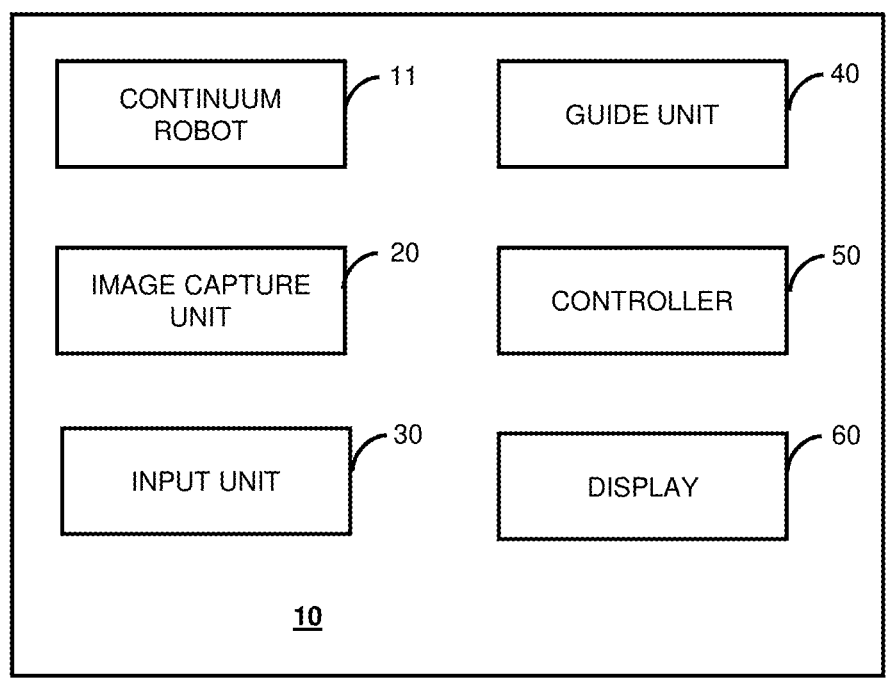
FIG. 6 illustrates a block diagram of a continuum robot apparatus according to an exemplary embodiment.
Figure 7:
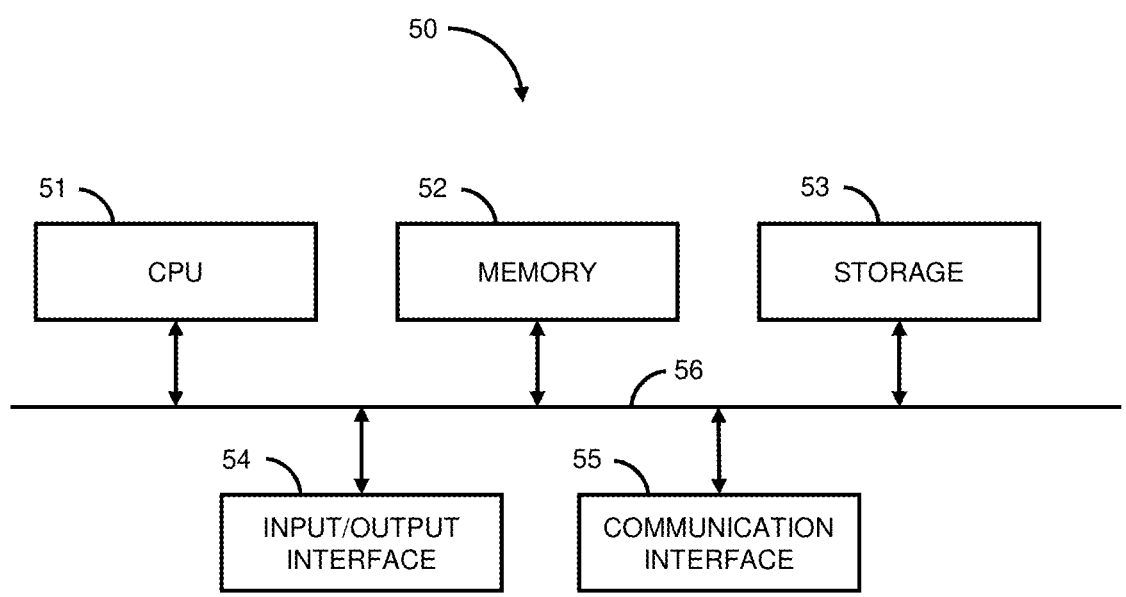
FIG. 7 illustrates a block diagram of a controller according to an exemplary embodiment.

FIGS. 5 to 7 illustrate features of an exemplary continuum robot apparatus 10 configuration according to some embodiments to implement automatic correction of a direction to which a tool channel or a camera moves or is bent in a case where a displayed image is rotated. The continuum robot apparatus 10 enables to keep a correspondence between a direction on a monitor (top, bottom, right or left of the monitor) and a direction the tool channel or the camera moves on the monitor according to a particular directional command (up, down, turn right or turn left) even if the displayed image is rotated.

As shown in FIGS. 5 and 6, the continuum robot apparatus 10 includes one or more of a continuum robot 11, an image capture unit 20, an input unit 30, a guide unit 40, a controller 50, a display 60, and can include other elements or components. The image capture unit 20 can be a camera or other image capturing device. The continuum robot 11 can include one or more flexible portions 12 connected together and configured so they can be curved or rotated about in different directions. The continuum robot 11 can include a drive unit 13, a movement drive unit 14, a linear drive 15, and can include other elements or components. The movement drive unit 14 causes the drive unit 13 to move along the linear guide 15.

The input unit 30 has an input element 32 and is configured to allow a user to positionally adjust the flexible portions 12 of the continuum robot 11. The input unit 30 is configured as a mouse, a keyboard, joystick, lever, or another type of input configuration to facilitate user interaction. The user can provide an operation input through the input element 32, and the continuum robot apparatus 10 can receive information of the input element 32 and one or more input/output devices, which can include a receiver, a transmitter, a speaker, a display, an imaging sensor, a user input device, and can include other elements or components. The input device, for example, can include a keyboard, a keypad, a mouse, a position tracked stylus, a position tracked probe, a foot switch, a microphone, and can include other elements or components. The guide unit 40 is a device that includes one or more buttons 42, knobs 44, switches, or the like, that a user can use to adjust various parameters the continuum robot 10, such as the speed or other parameters.

FIG. 7 illustrates the controller 50 according to some embodiments. The controller 50 is configured as a control circuit or circuitry for performing overall control of the elements of the continuum robot apparatus 10 and can include one or more of a CPU 51, a memory 52, a storage 53, an input and output (I/O) interface 54, a communication interface 55, and can include other elements or components. The continuum robot apparatus 10 can be interconnected with medical instruments or a variety of other devices, and can be controlled independently, externally, or remotely by the controller 50.

The memory 52 is used as a work memory. The storage 53 stores a program, computer instructions, code, software, or the like. The CPU 51, which may include one or more processors, circuitry, or a combination thereof, executes the program, instructions, code or software developed in the memory 52. The I/O interface 54 inputs information from the continuum robot apparatus 10 to the controller 50 and outputs information for displaying to the display 60.

The communication interface 55 is configured as a circuit or other device for communicating with components included the apparatus 10, and with various external apparatuses connected to the apparatus via a network. For example, the communication interface 55 can store information to be output in a transfer packet and output the transfer packet to an external apparatus via the network by communication technology such as Transmission Control Protocol/Internet Protocol (TCP/IP). The apparatus can include a plurality of communication circuits according to a desired communication form.

The controller 50 is communicatively interconnected or interfaced with one or more external devices including, for example, one or more data storages, one or more external user input/output devices, or other elements or components. The controller 50 interfaces with other elements including, for example, one or more of an external storage, a display, a keyboard, a mouse, a sensor, a microphone, a speaker, a projector, a scanner, a display, an illumination device, or the like.

The display 60 is a display device configured, for example, as a monitor, an LCD (liquid panel display), an LED display, an OLED (organic LED) display, a plasma display, an organic electro luminescence panel, or another type of display. Based on the control of the apparatus, a screen can be displayed on the display 60 showing one or more images being captured, captured images, captured moving images recorded on the storage unit, or the like.

The components are connected together by a bus 56 so the components can communicate with each other. The bus 56 transmits and receives data between these pieces of hardware connected together, or transmits a command from the CPU 51 to the other pieces of hardware. The components are implemented by one or more physical devices that may be coupled to the CPU 51 through a communication channel. For example, the controller 50 can be implemented using circuitry in the form of ASIC (application specific integrated circuits) or the like. Alternatively, the controller 50 can be implemented as a combination of hardware and software, where the software is loaded into a processor from a memory or over a network connection. Functionality of the controller 50 can be stored on a storage medium, which may include RAM (random-access memory), magnetic or optical drive, diskette, cloud storage, or the like.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

According to some embodiments, a direction to which a tool channel or a camera moves or is bent is corrected automatically in a case where a displayed image is rotated. The continuum robot apparatus 10 enables to keep a correspondence between a direction on a monitor (top, bottom, right or left of the monitor) and a direction the tool channel or the camera moves on the monitor according to a particular directional command (up, down, turn right or turn left) even if the displayed image is rotated.

Figure 8A:
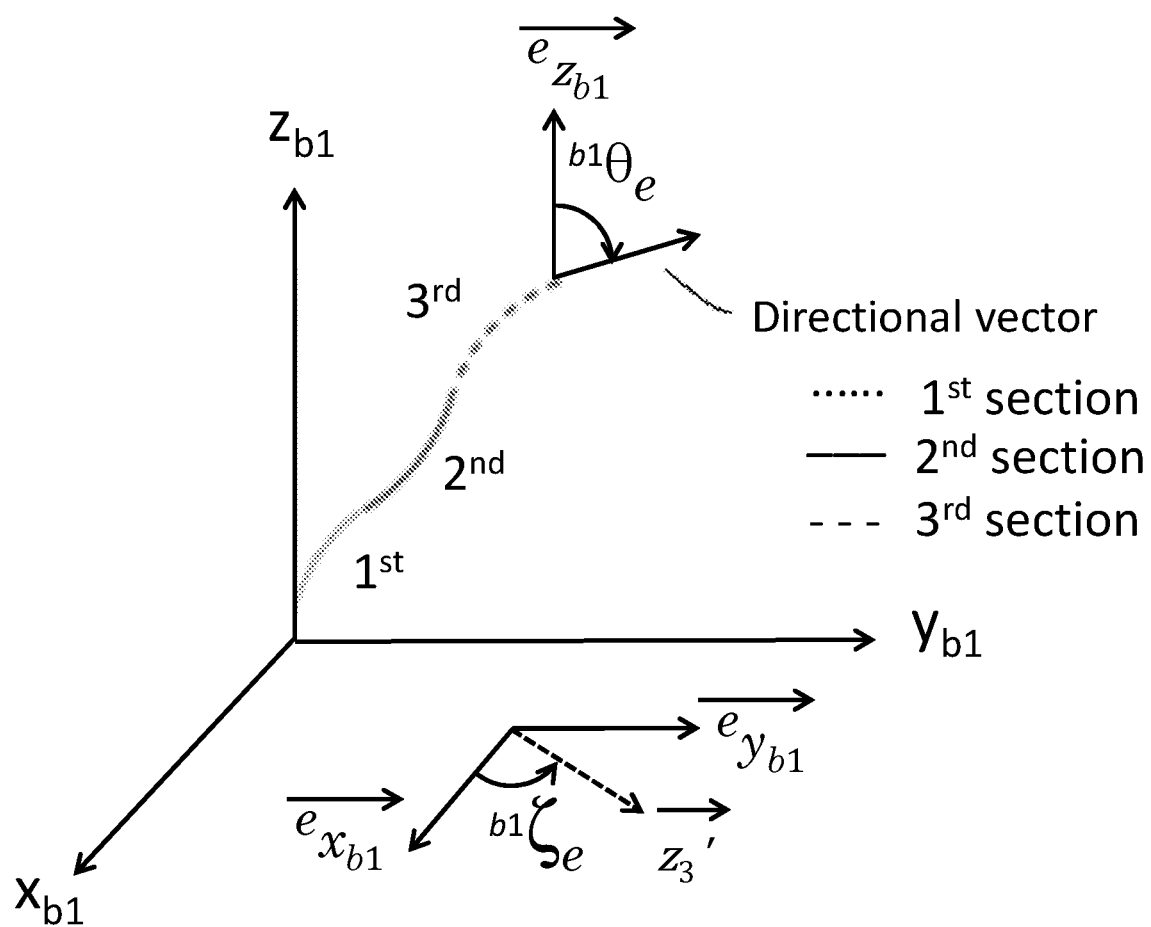
FIGS. 8(a) and 8(b) illustrate nomenclature according to an exemplary embodiment.
Figure 8B:
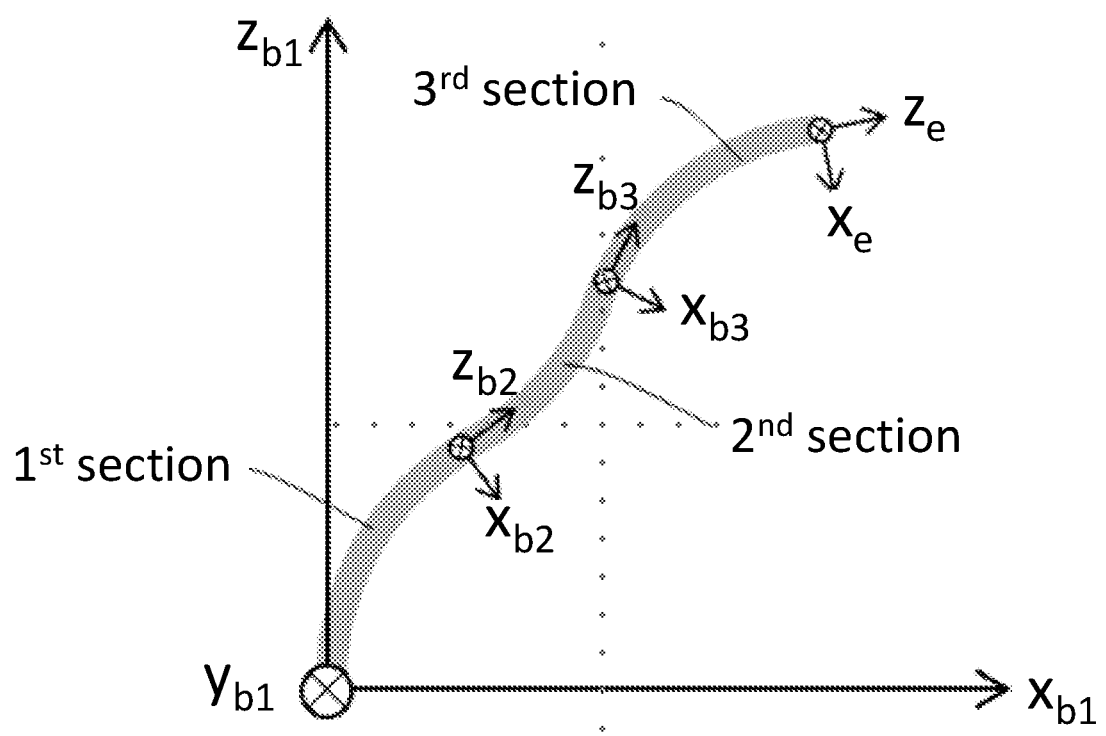

FIGS. 8(a) and 8(b) illustrate nomenclature for some embodiments. The nomenclature for the following embodiments is as follows.

$^A x$: x defined in {A} coordinate system.

$^A R_B$: Rotation matrix of coordinate system {B} relative to {A}.

a: anatomy coordinate system.
c: camera coordinate system.
e: end-effector coordinate system.
bi: base-coordinate system at the base of the i-th section of the robot (i=1: most proximal section of the robot).

$^A\theta$: bending angle: angle between $z_A$ axis and directional vector of the tip of the robot defined in {A} coordinate system.

$^A\zeta$: bending plane: angle between $x_A$ axis and directional vector of the tip of the robot projected onto $x_A$-$y_A$ plane defined in {A} coordinate system.

Figure 9:
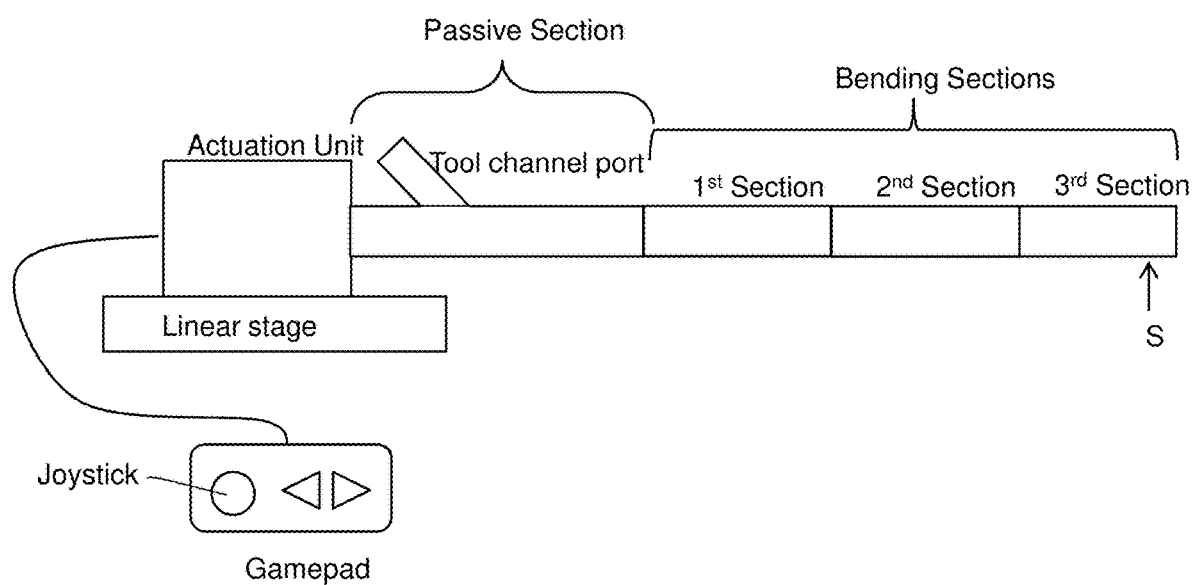
FIG. 9 illustrates a block diagram first embodiment according to an exemplary embodiment.

FIGS. 8 and 9 show an example for a three section robot and includes (a) a definition of bending angle and plane defined in the b1 coordinate system (robot-base coordinate system), and (b) a base-coordinate system at the base of the j-th section of the robot. The b1 coordinate system is attached to the base of the entire robot (=robot-base coordinate system). The end-effector coordinate system is attached the tip of the robot.

For First-Person Control with camera view aligned with the anatomy, a tendon-driven three-section robot with a tool channel is used to diagnose a lung nodule. The robot has a passive section and a bending section, and the bending section includes three sections ($1^{st}$, $2^{nd}$, and $3^{rd}$ sections). A gamepad is used as a user interface device to operate the robot.

Figure 10:
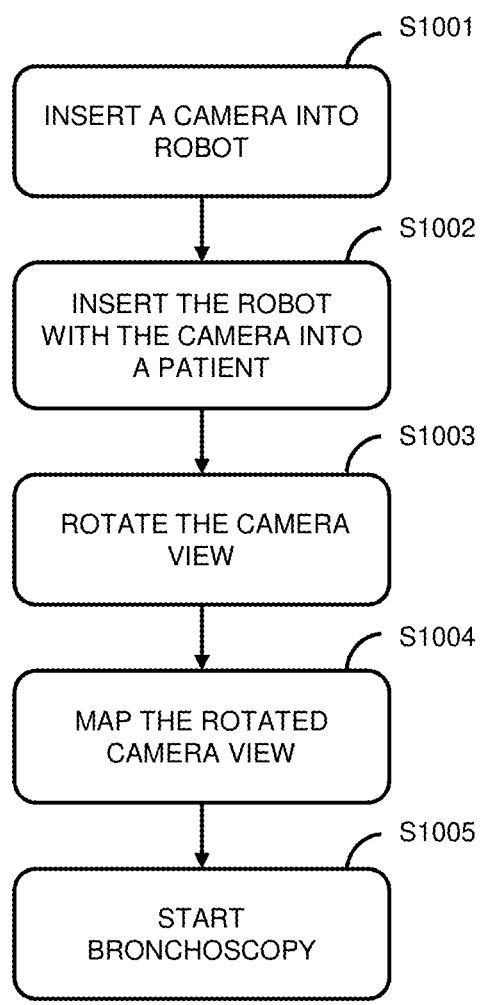
FIG. 10 illustrates a flowchart of a first embodiment for the automatic correction of the bending direction of a bronchoscope according to an exemplary embodiment.

A flowchart of this embodiment is shown in FIG. 10. The detail of each step is as follows.

Step S1001: an operator inserts a fiber optic camera into the robot through the tool channel, and deploys the camera at the tip of the robot.

Figure 11:
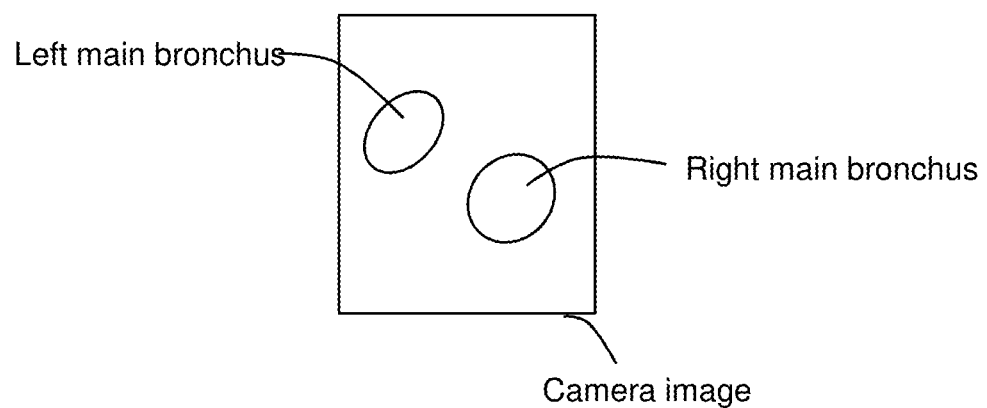
FIG. 11 illustrates a camera view where a roll is not calibrated according to an exemplary embodiment.

Step S1002: the operator inserts the robot with the camera into a patient through an endotracheal tube, and stops at the carina to display the right and left bronchus. At this point, the roll of the camera view is not calibrated (see FIG. 11).

Figure 12:
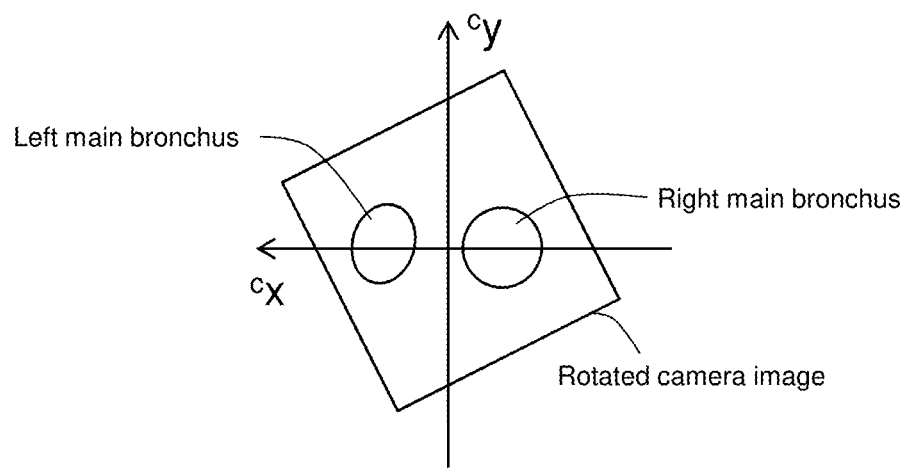
FIG. 12 illustrates a camera view where a left main bronchus and a right main bronchus are aligned horizontally according to an exemplary embodiment.

Step S1003: the operator rotates the camera view until the right and left bronchus are displayed horizontally (see FIG. 12) by adjusting the offset of the roll angle of camera view in software (offset 1).

Step S1004: the operator maps the rotated camera view, the direction of joystick on the gamepad and the robot.

After mapping or calibration, the direction of the camera view matches with direction of the gamepad used as a user interface device allowing the operator to operate the tip of the section in the camera coordinated system (First-Person Control). The joystick control is fully applied in a 360° fashion.

When the operator tries to point the robot toward the next target bronchus (see FIG. 13), the operator tilts the joystick on the gamepad. The amount the joystick is tilted decides the amount of desired bending angle of the tip of the robot, $^c\theta_{i+1}$, defined in the camera coordinate system and the direction of the joystick tilted decides the desired bending plane of the tip of the robot, $^c\zeta_{i+1}$, defined in the camera coordinate system.

The desired input ($^c\theta_{i+1}$, $^c\zeta_{i+1}$) is converted to ($^e\theta_{i+1}$, $^e\zeta_{i+1}$), then to ($^{b1}\theta_{i+1}$, $^{b1}\zeta_{i+1}$) defined in the camera, end-effector, and b1 coordinate system respectively. The converted input ($^{b1}\theta_{i+1}$, $^{b1}\zeta_{i+1}$) are stored in the memory of the robot system for Follow-The-Leader (FTL) motion described below. Here, the b1 coordinate system is the coordinate system attached to the base of the entire robot (robot-base coordinate system) as shown in FIGS. 8(a) and 8(b). The amount of tendons pulled/pushed is computed from ($^{b1}\theta_{i+1}$, $^{b1}\zeta_{i+1}$). Note that once the ($^{b1}\theta_{i+1}$, $^{b1}\zeta_{i+1}$) are derived, the amount of tendons pulled/pushed is computed without any dependence on the posture of other sections. The tendons are pulled/pushed based on the computed amount, and the robot is bent toward the desired direction.

Figure 13:
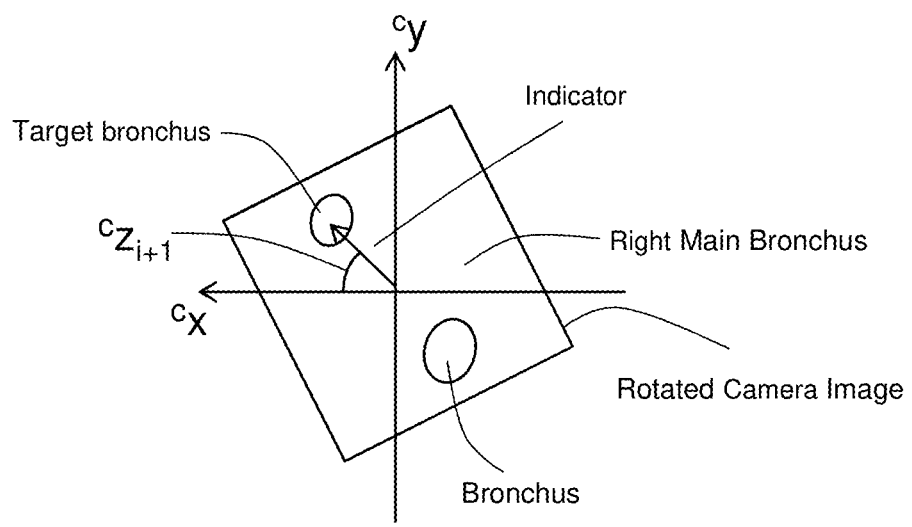
FIG. 13 illustrates a camera view where an arrow indicator is overlaid on the camera view according to an exemplary embodiment.

Because the camera view does not have depth information, deciding $^c\theta_{i+1}$ as the exact angle toward the next target bronchus is difficult. In this embodiment, the operator sets the maximal increment value of $^c\theta_{i+1}$ as the maximal tilting of the joystick and repeats aforementioned steps until the robot turns toward the next bronchus, i.e, the next bronchus comes to the center of the camera view. The operator can select the increment value of $^c\theta_{i+1}$ by adjusting the tilting amount of the joystick during operation. As shown in FIG. 13, an arrow indicator is overlaid over the camera view. The size and direction of the arrow indicate ($^c\theta_{i+1}$, $^c\zeta_{i+1}$). If the operator is well trained, the operator can set a larger increment value of $^c\theta_{i+1}$ through a dialog box in a graphical user interface (GUI) of the controller 50. The aforementioned series of repeated steps (visual feedback loop via the operator) is useful especially in a tortuous pathway where unexpected force is applied to the robot and causes the robot to deform. Because even if the motion of the robot had error due to unexpected force, the adjustable incremental value and trial-and-error steps by the operator eventually points the robot toward the next target bronchus. If the increment value is not small enough, the operator can set a new value through a dialog box in the GUI. This can be automated based on the tortuosity of the airway defined as the shape of the airway such as the total angle of bifurcation points.

The first and second sections are controlled by an FTL (Follow-The-Leader motion) algorithm. When the first and second sections pass through a bifurcation where the third section has already passed, the history of ($^{b1}\theta_3$, $^{b1}\zeta_3$) used for the third section is applied to other sections.

Figure 14:
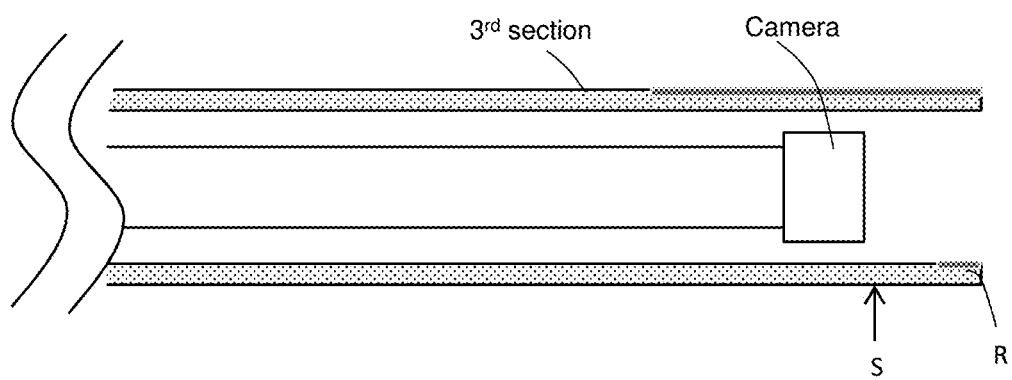
FIG. 14 illustrates retraction of a camera to a location S according to an exemplary embodiment.
Figure 15:
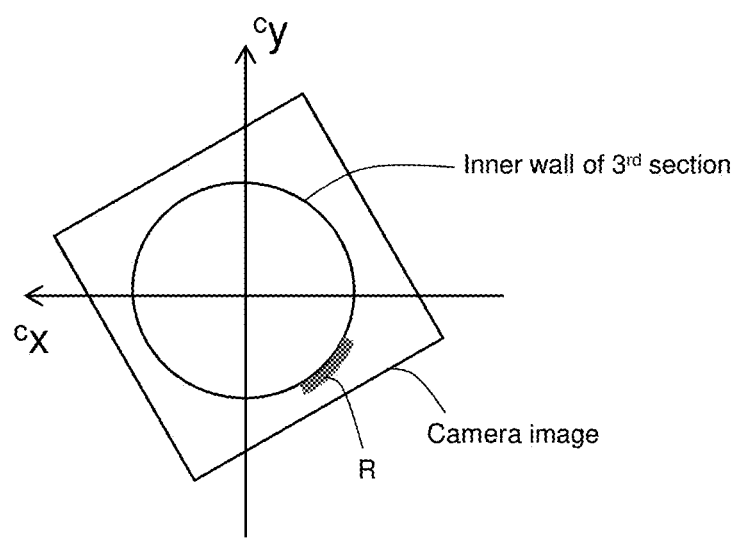
FIG. 15 illustrates a camera view at location S according to an exemplary embodiment.

For biopsy and reinsertion of the camera, when the robot reaches close to the tumor to be sampled, the camera is retracted to a location S in FIG. 14 to show a reference color mark R painted inside of the robot. A camera view at S is captured (see FIG. 15), and the rotation angle of the reference color mark R is estimated. Then the camera is fully retracted from the robot, and a biopsy tool is inserted to the tool channel for biopsy. After completion of biopsy, the camera is again inserted to the location S. The operator rotates the camera view until the reference color mark R shows up at the same rotation angle captured in FIG. 15 by updating the offset determined in step S1003.

Figure 16:
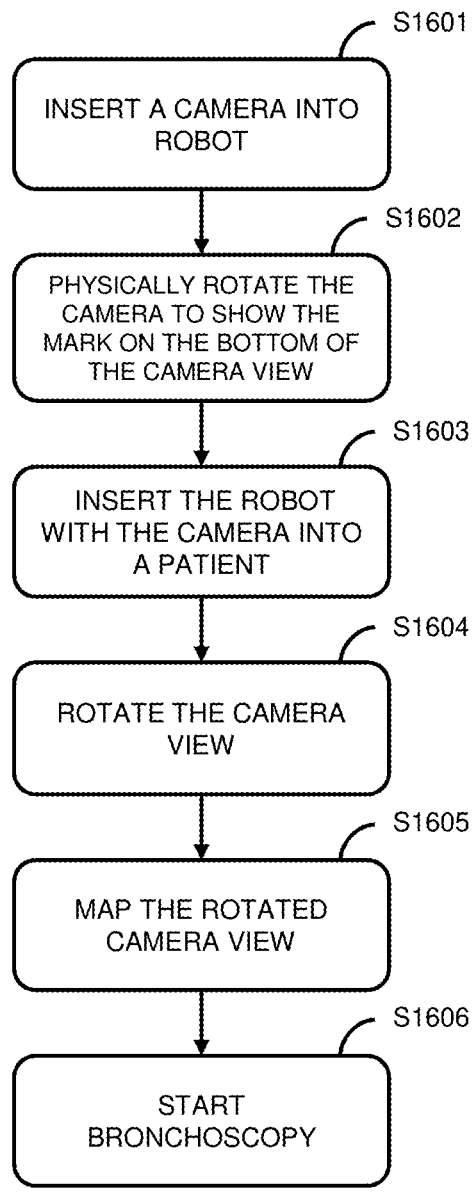
FIG. 16 illustrates a flowchart of a second embodiment for the automatic correction of the bending direction of a bronchoscope according to an exemplary embodiment.

The flowchart of a second embodiment is shown in FIG. 16. The details of each step is as follows.

In step S1601 an operator inserts a fiber optic camera into the robot through the tool channel, and stops at the location S to show the reference color mark R painted inside of the robot. The location of reference color mark R can be anywhere inside of the robot from the tip to the tool channel port.

Figure 17:
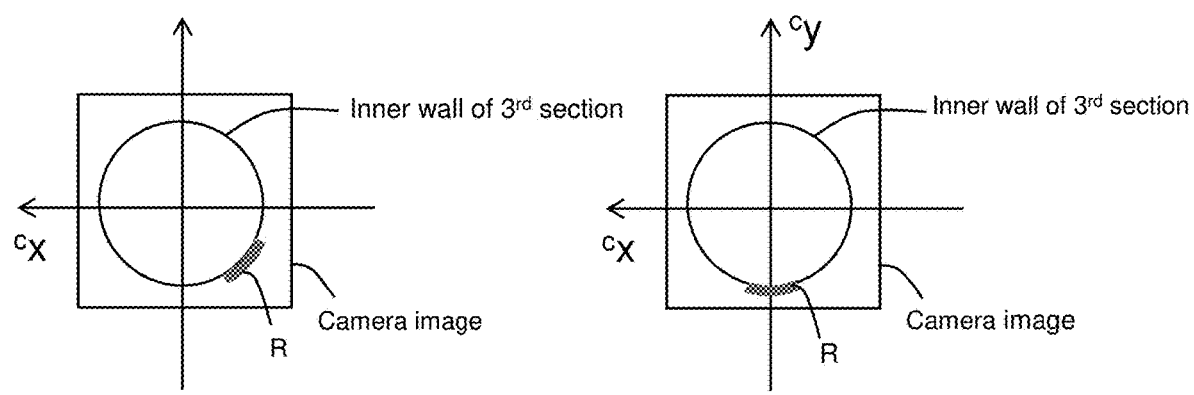
FIG. 17 illustrates a camera view where a reference color mark R shows up on the bottom of the camera view according to an exemplary embodiment.

In step S1602 the operator physically rotates the camera until the reference color mark R shows up on the bottom of the camera view (see FIG. 17). After rotating the camera, the operator inserts the camera to the tip of the robot. Because the roll orientation of camera and the robot is fixed by design, step S1002 maps the camera view, the robot, and the direction of joystick on the gamepad.

Figure 18:
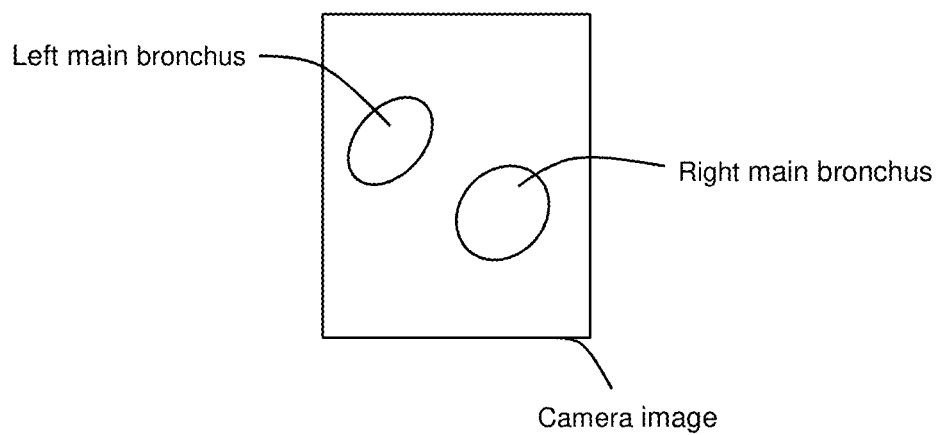
FIG. 18 illustrates a camera view where the roll is not calibrated according to an exemplary embodiment.

In step S1603 the operator inserts the robot with the camera into a patient through an endotracheal tube, and stops at the carina to display the right and left bronchus. At this point, the roll of the camera view is not calibrated (see FIG. 18).

In step S1604 the operator rotates the camera view until the right and left bronchus are displayed horizontally by adjusting the offset of the roll angle of camera view in software (offset 1).

In step S1605 the operator remaps the rotated camera view, the direction of joystick on the gamepad and the robot based on the offset 1. Every time the camera is retracted and reinserted, the roll orientation of the camera is physically adjusted using the reference color mark R.

Figure 19:
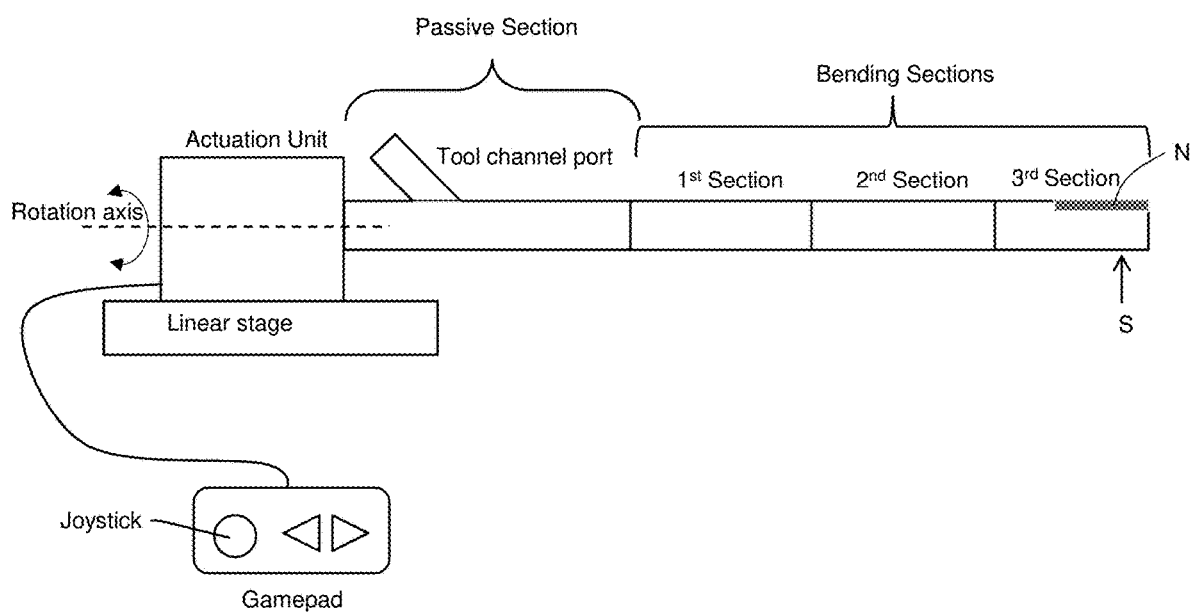
FIG. 19 illustrates a block diagram of a third embodiment with a rotation mechanism according to an exemplary embodiment.
Figure 20:
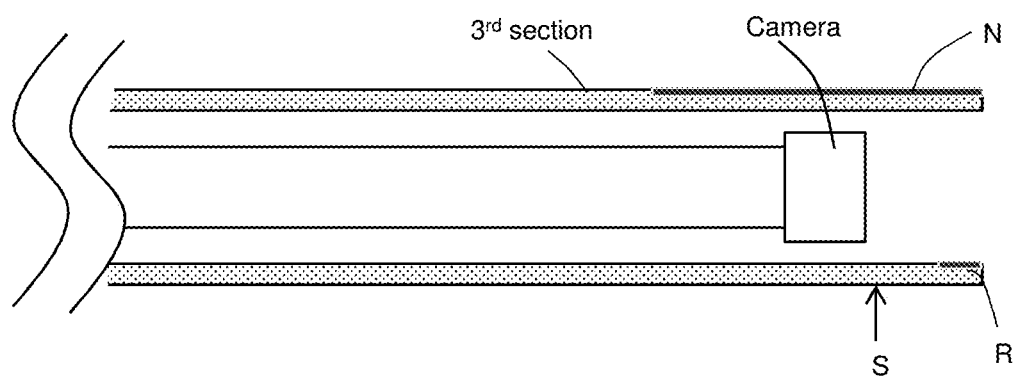
FIG. 20 illustrates retraction of a camera to a location S with a nose reference mark N according to an exemplary embodiment.

As shown in FIG. 19, the robot has a rotation mechanism that rotates the entire robot about the rotation axis shown in FIG. 19. The nose reference mark N is painted on the outer wall of the $3^{rd}$ section (FIGS. 19 and 20).

Figure 21:
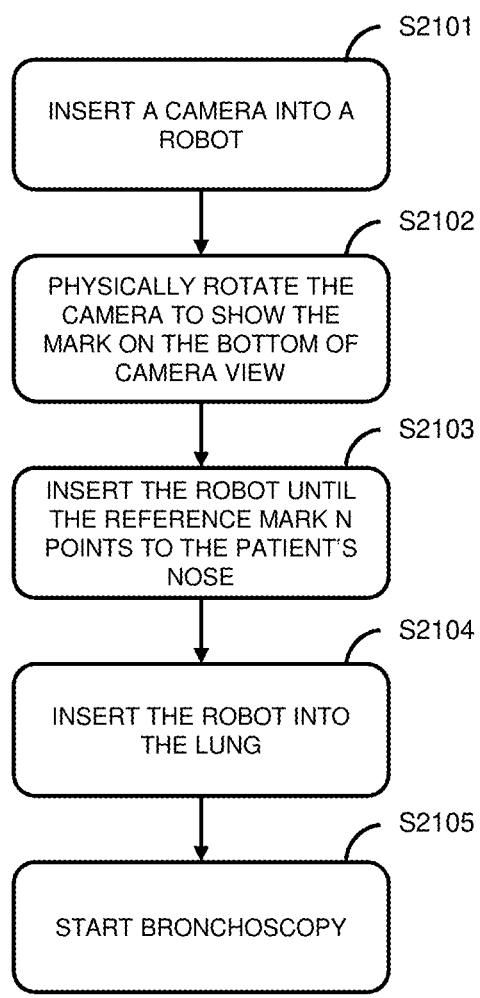
FIG. 21 illustrates a flowchart of the third embodiment according to an exemplary embodiment.

The flowchart of the third embodiment is shown in FIG. 21. The detail of each step is as follows.

In step S2101 an operator inserts a fiber optic camera into the robot through the tool channel, and stops at the location S to show the reference color mark R painted inside of the robot. The location of reference color mark R can be anywhere inside of the robot from the tip to the tool channel port.

In step S2102 the operator physically rotates the camera until the reference color mark R shows up on the bottom of the camera view (FIG. 17). After rotating the camera, the operator inserts the camera to the tip of the robot. Because the roll orientation of camera and the robot is fixed by design, step S2102 maps the camera view, the robot, and the direction of joystick on the gamepad.

In step S2013 when the operator inserts the robot into the lung through an endotracheal tube out of the patient's mouth, the operator rotates the entire robot using the rotation mechanism until the nose reference mark N points to the patient's nose. In step S2103, the nose is used as a landmark of the anatomy representing the orientation of the lung. This step is conducted at the entrance of the endotracheal tube.

In step S2104 the operator inserts the robot into the lung and stops at the carina to display the right and left bronchus. Because the anatomical relationship between the nose and the lung is consistent, and the nose and the roll angle of the robot and camera can always be fixed by design, the right and left bronchus are always displayed horizontally.

According to some embodiments, the viewpoint of the bronchoscope 101 moves in the same direction on the monitor 102 according to a particular command (for example, "up" command of the bronchoscope 101) even if the camera image 100 is rotated on the monitor 102. This may prevent a user from being confused and prevent a misoperation of the bronchoscope 101.

An operator can change the roll angle of camera view without losing mapped relationship between the rotated camera view, the direction of joystick on the gamepad and the robot.

According to some embodiments, a direction to which a tool channel or a camera moves or is bent is corrected automatically in a case where a displayed image is rotated. The continuum robot apparatus 10 enables to keep a correspondence between a direction on a monitor (top, bottom, right or left of the monitor) and a direction the tool channel or the camera moves on the monitor according to a particular directional command (up, down, turn right or turn left) even if the displayed image is rotated.

Additional features or aspects of present disclosure can also advantageously implement one or more AI (artificial intelligence) or machine learning algorithms, processes, techniques, or the like, to implement automatic correction of a direction to which a tool channel or a camera moves or is bent in a case where a displayed image is rotated. Such AI techniques use a neural network, a random forest algorithm, a cognitive computing system, a rules-based engine, or the like, and are trained based on a set of data to assess types of data and generate output. For example, a training algorithm can be configured to implement automatic correction of a direction to which a tool channel or a camera moves or is bent in a case where a displayed image is rotated. The model(s) can be configured as software that takes images as input and returns predictions for the given images as output. The model(s) can be an instance of a model architecture (set of parameter values) that has been obtained by model training and selection using a machine learning and/or optimization algorithm/process. A model can generally include, for example, an architecture defined by a source code (e.g. a convolutional neural network including layers of parameterized convolutional kernels and activation functions, or the like) and configuration values (parameters, weights, features, or the like) that are initially set to random values and are then over the course of the training iteratively optimized given data example, an objective function (loss function), an optimization algorithm (optimizer), or the like.

At least some of the medical images of detailed positional configurations of the patient anatomy relative to the catheter position can be used as input data and provided to the training algorithm. Initial images, output values and detailed positional configurations of the catheter position relative to the patient anatomy can be stored in a database to facilitate precise real-time correction of regional tissue deformation during an endoscopy procedure for new data. Through visualization guidance of device-to-image registration that are generated using input mapping to the model(s) or through expert research, machine learning can find parameters for AI processes. The training algorithm is configured to learn physical relationships in the input data to best describe these relationships or correlations. The data sets include information based on a number of factors including, for example, the acquired images, the number of acquired images, the angle of the image, the position of the image, detailed positional configurations of the medical device relative to the branching model, or the like. The data is evaluated using a weighted evaluation where the weights are learned through a training process, through subject matter specifications, or the like. Deep learning mechanisms can augment an AI process to identify indicators in the image data that can include, for example, new data images, output values or positional configurations of the catheter position relative to the patient anatomy, or the like.

According to some embodiments, an apparatus for correction of a direction to which a tool channel or a camera moves or is bent in a case where a displayed image is rotated. The apparatus includes at least one memory and at least one processor that executes instructions stored in the memory to receive a directional command of a capturing direction of a camera, move the capturing direction of the camera according to the received directional command, detect a rotation amount of a captured image displayed on a monitor, wherein the captured image is captured by the camera, and correct, based on the detected rotation amount, directional information corresponding to a particular directional command or directional coordinate for moving the camera, wherein the directional information is used for moving the capturing direction of the camera.

A storage medium storing a program may be configured to cause a computer to execute the method of aligning an alignment target of an object having an outside cylindrical surface to an outer cylindrical surface of an outer aligning component.

Features of the present disclosure implement automatic correction of a direction to which a tool channel or a camera moves or is bent in a case where a displayed image is rotated.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
   a controller comprising a memory and a processor, wherein the processor, wherein the processor executes instructions stored in the memory to:
   move an imaging device to capture one or more images;
   display an image captured by the imaging device on a monitor;
   receive a directional command of a capturing direction of the imaging device from a user interface device that a user operates;
   move the capturing direction of the imaging device according to the received directional command;
   determine a rotation amount of the displayed image on the monitor;
   determine a correction amount of movement of the imaging device based on the rotation amount of the displayed image and the directional command of the capturing direction of the imaging device; and
   automatically move the imaging device by the controller based on the correction amount to keep a correspondence on the monitor between a direction of the displayed image and a direction to which the imaging device moves.

2. The apparatus according to claim 1, further comprising an input device.

3. The apparatus according to claim 1, further comprising a guide unit.

4. The apparatus according to claim 1, further comprising a display.

5. The apparatus according to claim 1, further comprising a rotation mechanism.

6. The apparatus according to claim 1, wherein the apparatus is a continuum robot or a fiber optic camera.

7. The apparatus according to claim 1, wherein the controller further performs a follow-the-leader process.

8. The apparatus according to claim 1, wherein the controller further performs base coordinate control.

9. The apparatus according to claim 1, wherein the controller further performs artificial intelligence or machine learning.

10. The apparatus according to claim 9, wherein the artificial intelligence or machine learning is iterative.

11. A method for controlling an apparatus, the method comprising:
    moving an imaging device to capture one or more images;
    displaying an image captured by the imaging device on a monitor;
    receiving a directional command of a capturing direction of the imaging device from a user interface device that a user operates;
    moving the capturing direction of the imaging device according to the received directional command;
    determining a rotation amount of the displayed image on the monitor;
    determining a correction amount of movement of the imaging device based on the rotation amount of the displayed image and the directional command of the capturing direction of the imaging device; and
    automatically moving the imaging device by a controller based on the correction amount to keep a correspondence on the monitor between a direction of the displayed image and a direction to which the imaging device moves.

12. The method according to claim 11, further comprising providing the apparatus with an input device.

13. The method according to claim 11, further comprising providing the apparatus with a guide unit.

14. The method according to claim 11, further comprising providing the apparatus with a controller.

15. The method according to claim 11, further comprising providing the apparatus with a display.

16. The method according to claim 11, further comprising providing the apparatus with a rotation mechanism.

17. The method according to claim 11, wherein the apparatus is a continuum robot or a fiber optic camera.

18. The method according to claim 11, further comprising performing a follow-the-leader process.

19. The method according to claim 11, further comprising performing base coordinate control.

20. The method according to claim 11, further comprising performing artificial intelligence or machine learning.

21. The method according to claim 20, wherein the artificial intelligence or machine learning is iterative.

22. A non-transitory computer readable storage medium storing a program for causing a computer to execute a method for controlling an apparatus, the method comprising:
- moving an imaging device to capture one or more images;
- displaying an image captured by the imaging device on a monitor;
- receiving a directional command of a capturing direction of the imaging device from a user interface device that a user operates;
- moving the capturing direction of the imaging device according to the received directional command;
- moving the captured image displayed on the monitor;
- determining a rotation amount of the displayed image displayed on the monitor;
- determining a correction amount of movement of the imaging device based on the rotation amount of the displayed image and the directional command of the capturing direction of the imaging device; and
- automatically moving the imaging device by a controller based on the correction amount to keep a correspondence on the monitor between a direction of the displayed image and a direction to which the imaging device moves.

* * * * *